US007215795B2

(12) United States Patent
Ito et al.

(10) Patent No.: US 7,215,795 B2
(45) Date of Patent: May 8, 2007

(54) INTRUDING OBJECT DETECTING METHOD AND INTRUDING OBJECT MONITORING APPARATUS EMPLOYING THE METHOD

(75) Inventors: Wataru Ito, Kodaira (JP); Hirotada Ueda, Kokubunji (JP); Toshimichi Okada, Zama (JP); Miyuki Fujii, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 583 days.

(21) Appl. No.: 09/964,336

(22) Filed: Sep. 28, 2001

(65) Prior Publication Data

US 2002/0051058 A1 May 2, 2002

(30) Foreign Application Priority Data

Sep. 28, 2000 (JP) .............................. 2000-296995

(51) Int. Cl.
*G06K 9/00* (2006.01)
(52) U.S. Cl. ...................................... 382/103; 348/169
(58) Field of Classification Search ................ 382/100, 382/103, 104, 107; D16/203; 348/169
See application file for complete search history.

(56) References Cited

U.S. PATENT DOCUMENTS

| 4,437,161 | A | * | 3/1984 | Anderson ................... 600/425 |
| 5,280,530 | A | * | 1/1994 | Trew et al. .................. 382/103 |
| 5,406,501 | A | * | 4/1995 | Florent ........................ 348/169 |
| 5,574,762 | A | * | 11/1996 | Sato et al. ...................... 377/6 |
| 5,721,692 | A | * | 2/1998 | Nagaya et al. ............... 345/475 |
| 5,724,475 | A | * | 3/1998 | Kirsten ........................ 386/109 |
| 6,192,322 | B1 | * | 2/2001 | Rafanelli et al. ........... 702/150 |
| 6,404,455 | B1 | * | 6/2002 | Ito et al. ...................... 348/169 |
| 6,421,452 | B1 | * | 7/2002 | Matsuura et al. ........... 382/107 |
| 6,819,353 | B2 | * | 11/2004 | Heyden ....................... 348/143 |

FOREIGN PATENT DOCUMENTS

| JP | 8221578 | 8/1996 |
| JP | B-2633694 | 7/1997 |
| JP | A-9-288732 | 11/1997 |

OTHER PUBLICATIONS

U.S. Appl. No. 09/078,521.
U.S. Appl. No. 09/392,622.
U.S. Appl. No. 09/362,212.
U.S. Appl. No. 09/671,178.
U.S. Appl. No. 09/933,164.

* cited by examiner

*Primary Examiner*—Vikkram Bali
*Assistant Examiner*—Anand Bhatnagar
(74) *Attorney, Agent, or Firm*—Mattingly, Stanger, Malur & Brundidge, P.C.

(57) ABSTRACT

An intruding object detecting method and an intruding object monitoring apparatus for detecting a target object intruding into an image pickup region while reducing the error detection of moving objects other than the target object. A difference in pixel value between an input image signal and each of different image signals in a predetermined number of frames greater than one is calculated for each pixel to thereby obtain differential images in the predetermined number of frames. The differential images in the predetermined number of frames are synthesized in predetermined proportions to thereby generate a synthesized differential image. The synthesized differential image is binarized on the basis of a predetermined threshold value to thereby generate a binarized image. A binarized object in the binarized image is detected as an object intruding into a monitoring visual field.

12 Claims, 12 Drawing Sheets

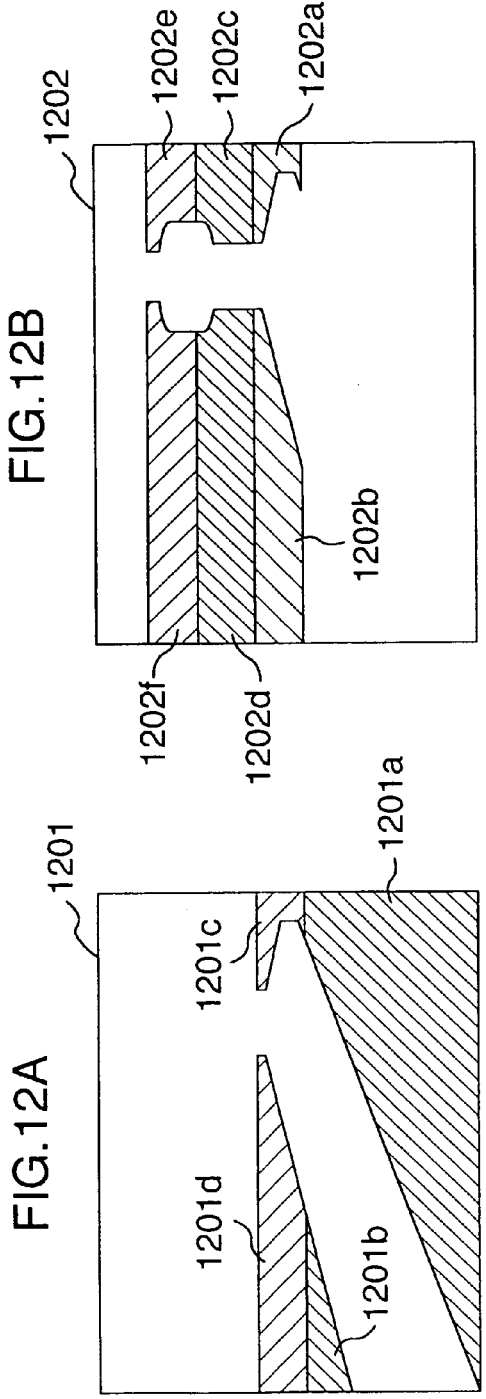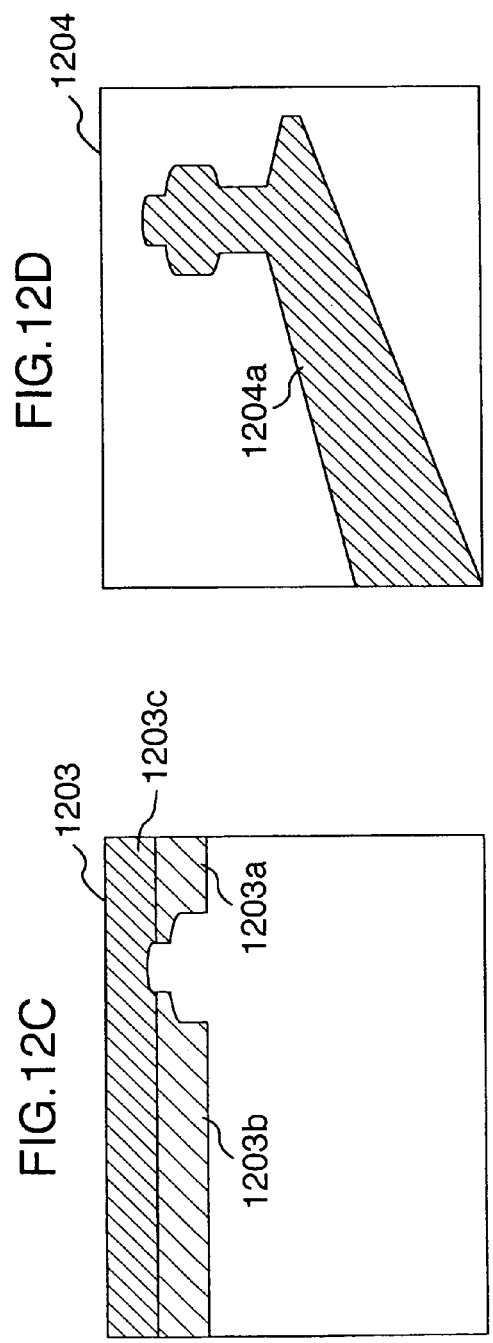

INTRUDING OBJECT DETECTING METHOD AND INTRUDING OBJECT MONITORING APPARATUS EMPLOYING THE METHOD

CROSS-REFERENCE TO RELATED APPLICATIONS

This invention relates to the following U.S. Patent Applications.

Patent application Ser. No. 09/078,521, filed on May 14, 1998, in the names of Wataru Ito, Hirotada Ueda, Toshimichi Okada and Miyuki Endo and entitled "METHOD FOR TRACKING ENTERING OBJECT AND APPARATUS FOR TRACKING AND MONITORING OBJECT";

Patent application Ser. No. 09/392,622, filed on Sep. 9, 1999, in the names of Wataru Ito, Hiromasa Yamada and Hirotada Ueda and entitled "METHOD OF UPDATING REFERENCE BACKGROUND IMAGE, METHOD OF DETECTING ENTERING OBJECTS AND SYSTEM FOR DETECTING ENTERING OBJECTS USING THE METHODS";

Patent application Ser. No. 09/362,212, which is a Continuation-in-part of U.S. Ser. No. 09/078,521, filed on May 14, 1998, in the names of Wataru Ito, Hirotada Ueda and Hiromasa Yamada and entitled "METHOD OF DISTINGUISHING A MOVING OBJECT AND APPARATUS OF TRACKING AND MONITORING A MOVING OBJECT";

Patent application Ser. No. 09/671,178, filed on Sep. 28, 2000, in the names of Wataru Ito and Hirotada Ueda and entitled "INTRUSION OBJECT DETECTING METHOD AND INTRUSION OBJECT DETECTING APPARATUS"; and Patent application Ser. No. 09/933,164, filed on August, 2001, in the names of Wataru Ito and Hirotada Ueda and Toshimichi Okada and entitled "OBJECT DETECTING METHOD AND OBJECT DETECTING APPARATUS AND INTRUDING OBJECT MONITORING APPARATUS EMPLOYING THE OBJECT DETECTING METHOD".

BACKGROUND OF THE INVENTION

The present invention relates to a monitoring apparatus using an image pickup device and particularly to an intruding object detecting method and an intruding object monitoring apparatus for automatically detecting an object intruding into a monitoring visual field, as a target object to be detected, from video signals supplied from an image pickup device under a monitoring environment in which the trembling of trees, waves or the like is also observed.

An intruding object monitoring apparatus using an image pickup device such as a camera as an image input means is to detect an object intruding into a monitoring visual field or to confirm the kind of the object to thereby automatically issue a predetermined announcement or alarm without depending on manned monitoring by a watcher which is hetherto done. In order to achieve such a system, there is a method in which: an input image obtained from the image input means such as a camera is first compared with a reference background image (that is, an image in which an object to be detected is not picked up) or with another input image which was obtained at a time different from the time when the first-mentioned input image is obtained; a difference between the input image and the reference background image or between the two input images is detected for each pixel; and a region having a large difference is extracted as an object. This method is known as "subtraction method" and has been widely used conventionally. Particularly, the method using the difference between the input image and the reference background image is known as "background subtraction method" and the method using the difference between the input images obtained at different times is known as "frame subtraction method".

The processing by the background subtraction method will be first described with reference to FIG. 5. FIG. 5 is a diagram for explaining the principle of processing the object detection according to the background subtraction method. In FIG. 5, a reference numeral 101 designates an input image; 105, a reference background image; 501, a difference image according to the background subtraction method; 502, a binarized image of the difference image 501; 112, a subtractor; and 115, a binarizer.

In FIG. 5, the subtractor 112 calculates the difference in luminance value between two frame images (that is, the input image 101 and the reference background image 105 in FIG. 5) for each pixel to thereby output the difference image 501. The binarizer 115 produces the binarized image 502 in the condition that the pixel value of each pixel of the difference image 501 is set to "0" when it is smaller than a predetermined threshold value Th and the pixel value is set to "255" when it is equal to or greater than the threshold value Th (the pixel value of one pixel is calculated on the assumption that each pixel is composed of 8 bits).

The human-like object 503 picked up in the input image 101 in this manner is calculated as a region 504 where a difference is generated by the subtractor 112. The region 504 is then detected by the binarizer 115 as an image 505 indicating a cluster of pixels with the pixel value of "255". For example, JP-A-9-288732 discloses an application example of the background subtraction method.

Next, the processing by the frame subtraction method will be described with reference to FIG. 6. FIG. 6 is a diagram for explaining the principle of processing the object detection according to the frame subtraction method. In FIG. 6, a reference numeral 101 designates a first input image; 102, a second input image which is obtained by imaging the same range of visual field as the first input image at a time different from the time when the first input image 101 is obtained; 601, a difference image according to the frame subtraction method; 602, a binarized image of the difference image 601; 112, a subtractor; and 115, a binarizer.

In FIG. 6, the subtractor 112 calculates the difference in luminance value between two frame images (that is, the first input image 101 and the second input image 102 in FIG. 6) for each pixel and outputs the difference image 601 in the same manner as that in FIG. 5. The binarizer 115 produces the binarized image 602 in the condition that the pixel value of each pixel of the difference image 601 is set to "0" when it is smaller than a predetermined threshold value Th and the pixel value is set to "255" when it is equal to or greater than the threshold value Th (the pixel value of one pixel is calculated on the assumption that each pixel is composed of 8 bits) in the same manner as that in FIG. 5.

The human-like objects 603 and 604 picked up in the first and second input images 101 and 102 respectively in this manner are calculated as a region 605 where a difference is generated by the subtractor 112. The region 605 is detected by the binarizer 115 as an image 606 indicating a cluster of pixels with the pixel value of "255". For example, JP-B-2633694 discloses an application example of the frame subtraction method.

SUMMARY OF THE INVENTION

The background subtraction method has a feature in that a target object can be detected even in the case where the apparent moving velocity of the target object on input images is slow. The background subtraction method, however, has a problem that a moving object such as trembling of leaves, waves or the like is detected by mistake if there is such moving object on the input images. On the other hand, the frame subtraction method has a feature in that erroneous detection of moving objects can be reduced when a time interval for acquiring two frame images to be subjected to a subtraction process is set appropriately (when setting is made such that the change in trembling of leaves, waves, or the like, between the two frame images becomes small) in the case where there is a moving object such as the trembling of leaves, waves or the like. The frame subtraction method, however, has a problem that a target object cannot be detected in the case where the apparent moving velocity of the target object to be detected on input images is slow.

An object of the present invention is to provide an intruding object detecting method and an intruding object monitoring apparatus for detecting a target object intruding into an image pickup region while reducing erroneous detection of moving objects other than the target object.

According to an aspect of the present invention, there is provided an intruding object detecting method comprising the steps of: inputting images of a monitoring visual field from an image pickup device; storing the images from the image pickup device in a memory device; calculating for each pixel a difference in luminance value between a current input image from the image pickup device and each of different input images in a predetermined number of frames greater than one to thereby generate respective differential images; adding the respective differential images, each of which is given weight with predetermined proportion to thereby generate a synthesized differential image; binarizing the synthesized differential image on the basis of a predetermined threshold value to thereby generate a binarized image; and detecting an object in the binarized image as an object intruding within the monitoring visual field.

According to a preferred feature of the present invention, one frame in the different images in the predetermined number of frames greater than one is used as a reference background image and the other frames are-used as input images obtained at respective times different from the current time when the current input image is obtained.

The merits and demerits of the frame subtraction method and of the background subtraction method are rearranged as follows.

Frame Subtraction Method

Merit: It is possible to reduce an erroneous detection of moving objects by appropriately setting the time intervals at which images in two frames used for the subtraction processing are acquired.

Demerit: It is impossible to detect an object making apparently small motions (small in the quantity of movement on the image screen at a time interval $\Delta t$).

Background Subtraction Method

Merit: It is possible to detect even an object making apparently small motions (it is also possible to detect an object which stands still).

Demerit: Moving objects other than the target object to be detected may be erroneously detected.

The inventors of this application have made experiments (frame time interval $\Delta t = 100$ ms) with the frame subtraction method and the background subtraction method applied to a surveillance ship for detecting an object intruding a region on the sea. As a result, the following knowledge has been found.

In the frame subtraction method, it is possible to suppress reflection of the setting sun in the surface of the sea (the area of an error detection region is small even in the case where the error detection region is detected).

In the background subtraction method, it is impossible to suppress error detection due to reflection of the setting sun (the area of the error detection region is large).

Erroneous detection due to reflection of the setting sun occurs frequently on this side i.e. foreground side of an image (because waves look larger as the position on the image becomes nearer to this side.

In the frame subtraction method, it is impossible to detect a ship at a long distance (because the apparent quantity of movement of the ship is too small).

The following conclusion has been obtained from these results.

The frame subtraction method is effective in detecting this side or foreground of a scene (that is, in detecting a nearer object).

The background subtraction method is effective in detecting the far side or background of a scene (that is, in detecting a remoter object).

Therefore, according to a feature of the present invention, the frame subtraction method and the background subtraction method are hybridized so that the frame subtraction method is used in an image picked up on this side of a scene by a television camera and the background subtraction method is used in an image picked up on the far side of the scene to thereby improve intruding object detecting performance.

BRIEF DESCRIPTION OF THE DRAWINGS

FIGS. 12A to 12D are diagrams showing an example in which in the weighting coefficient image, weighting coefficients are set by three values;

DESCRIPTION OF THE EMBODIMENTS

Embodiments of the present invention will be described below with reference to the drawings. In all the drawings, like parts are referenced correspondingly.

Figure 4:
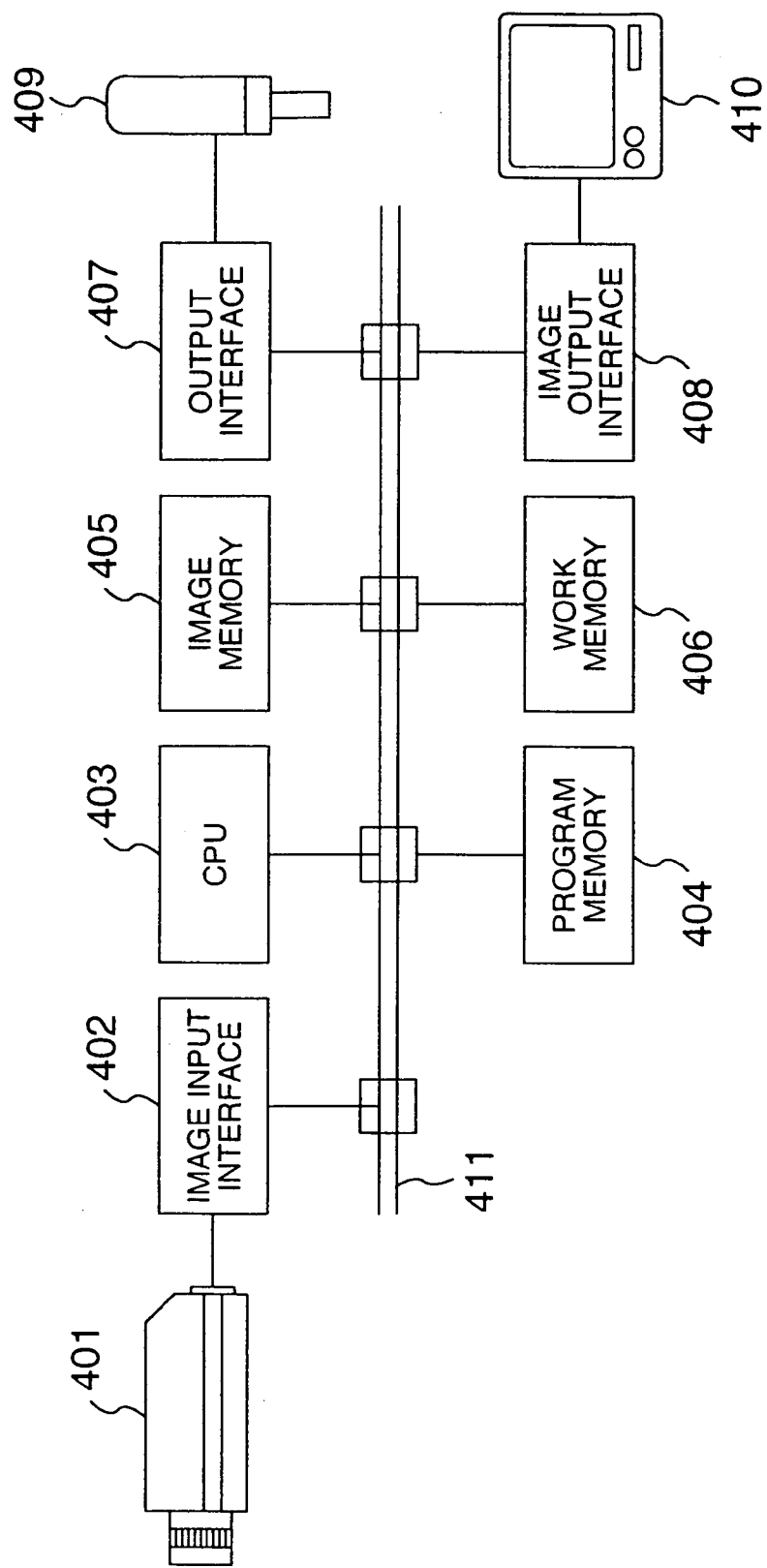
FIG. 4 is a block diagram showing the hardware configuration of an intruding object monitoring apparatus to which the present invention is applied.
Figure 5:
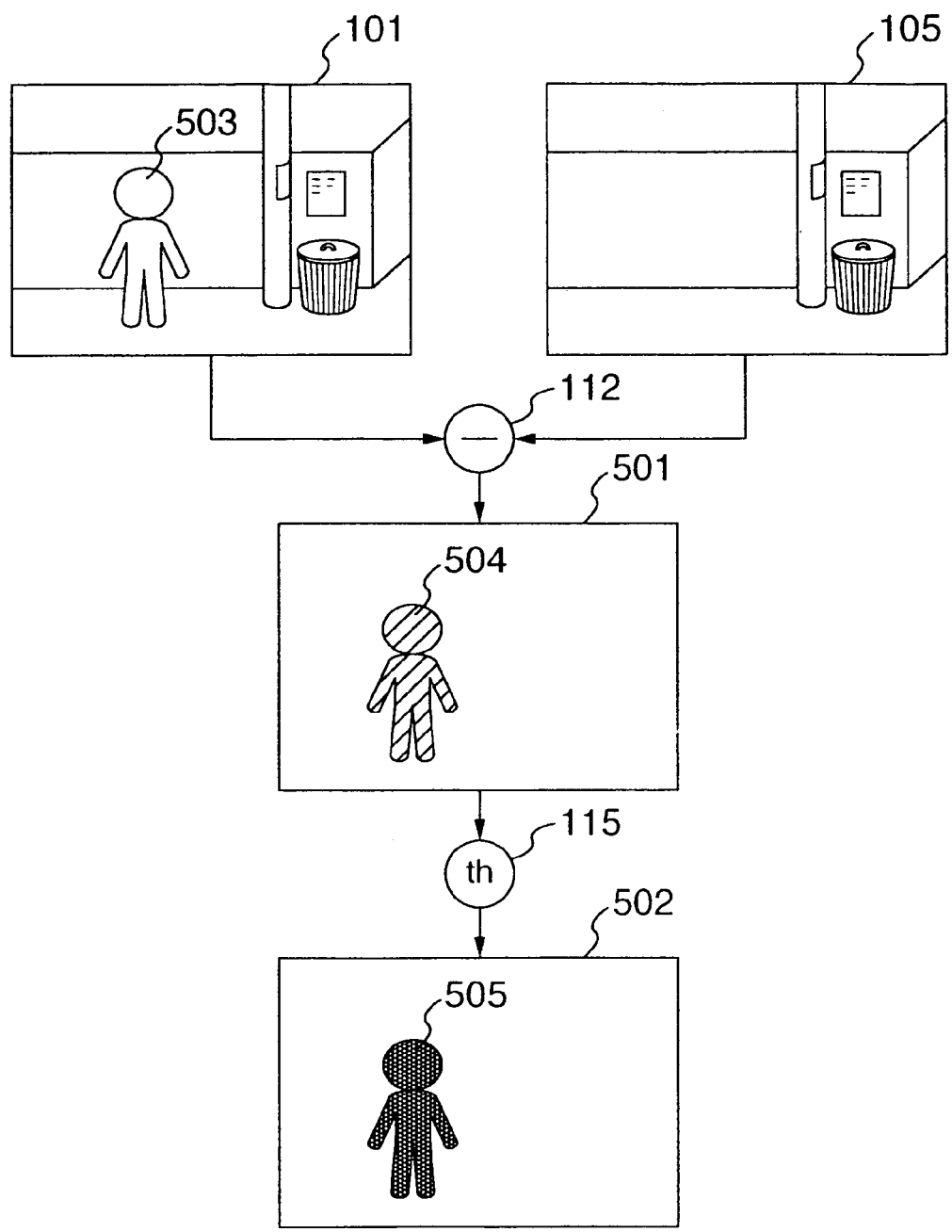
FIG. 5 is a diagram for explaining the principle of an object detecting process in a background frame subtraction method in the related art.

FIG. 4 is a block diagram showing the hardware configuration of an intruding object monitoring apparatus to which the present invention is applied. First, referring to FIG. 4, the intruding object monitoring apparatus will be described.

In FIG. 4, the intruding object monitoring apparatus has a television camera (hereinafter referred to as TV camera) 401, an image input interface 402, a CPU 403, a program memory 404, an image memory 405, a work memory 406, an output interface 407, an image output interface 408, an alarm lamp 409, a monitor 410, and a data bus 411.

The TV camera 401 is connected to the image input interface 402. The monitor 410 is connected to the image output interface 408. The alarm lamp 409 is connected to the output interface 407. The image input interface 402, the CPU 403, the program memory 404, the image memory 405, the work memory 406, the output interface 407 and the image output interface 408 are connected to the data bus 411.

In FIG. 4, the TV camera 401 picks up an image in an image pickup visual field including a region to be monitored. The TV camera 401 converts the picked-up image into a video signal and supplies the video signal to the image input interface 402. The image input interface 402 converts the input video signal into image data of a format (for example, with a width of 320 pixels, a height of 240 pixels and a depth of 8 bit/pixel) allowed to be dealt with by the intruding object monitoring apparatus and delivers the image data to the image memory 405 through the data bus 411. The image memory 405 stores the image data supplied from the image input interface 402.

The CPU 403 analyzes images stored in the image memory 405 by using the work memory 406 in accordance with an operating program retained in the program memory 404. As a result of the analysis, the CPU 403 obtains information as to whether an object intrudes into the image pickup visual field of the TV camera 401 or not. The CPU 403 displays, for example, a processed result image on the monitor 410 through the image output interface 408 from the data bus 411 and turns the alarm lamp 409 on through the output interface 407.

The image output interface 408 converts a signal of the CPU 403 into a signal of a format (for example, NTSC video signal) allowed to be used by the monitor 410 and delivers the converted signal to the monitor 410. The monitor 410 displays, for example, an intruding object detecting result image.

Figure 2:
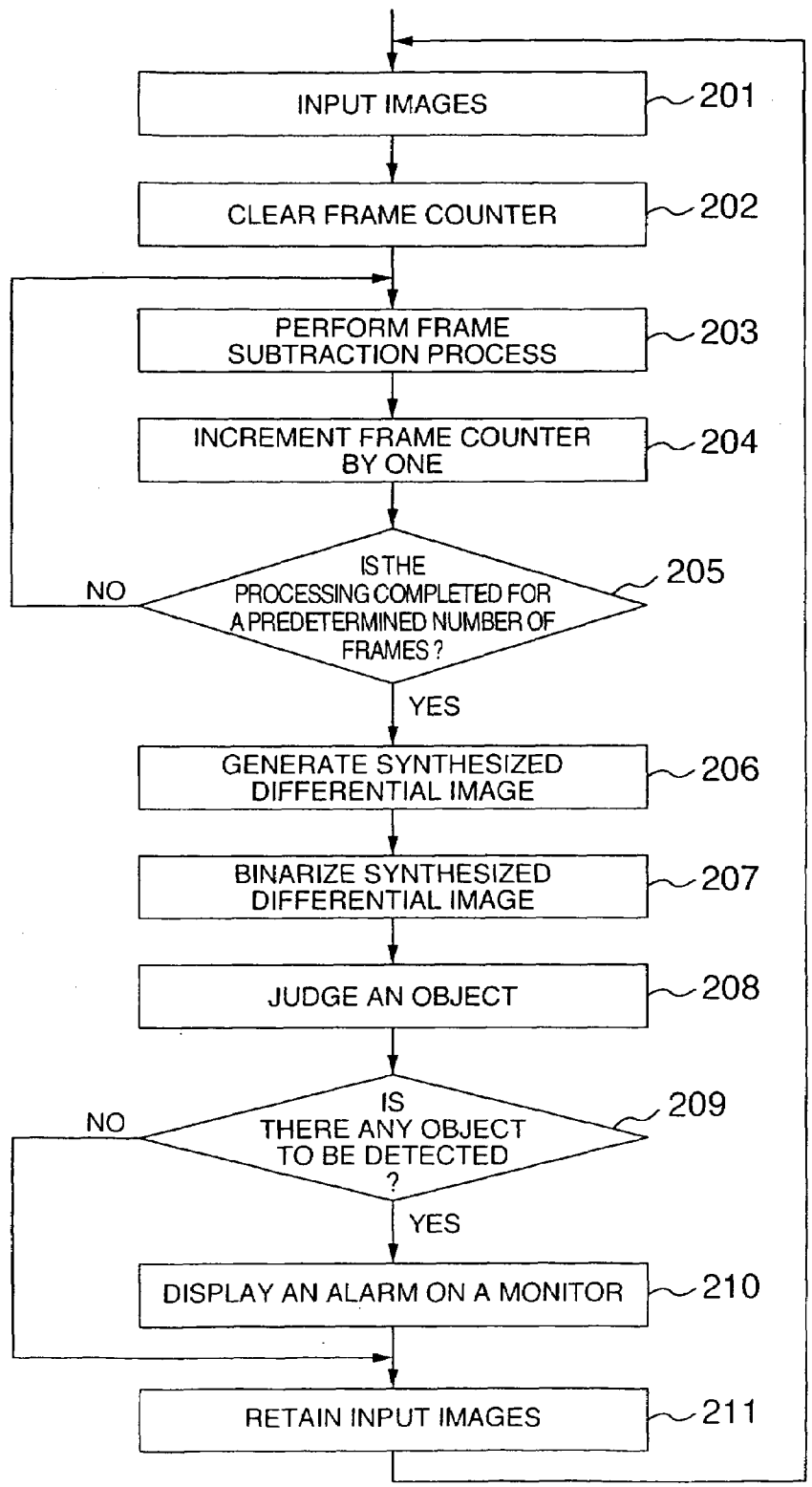
FIG. 2 is a flow chart showing an intruding object detecting procedure according to a first embodiment of the present invention.

FIG. 2 is a flow chart showing an intruding object detecting procedure according to a first embodiment of the present invention. This flow is executed by use of the hardware configuration of the intruding object monitoring apparatus shown in FIG. 4.

Figure 6:
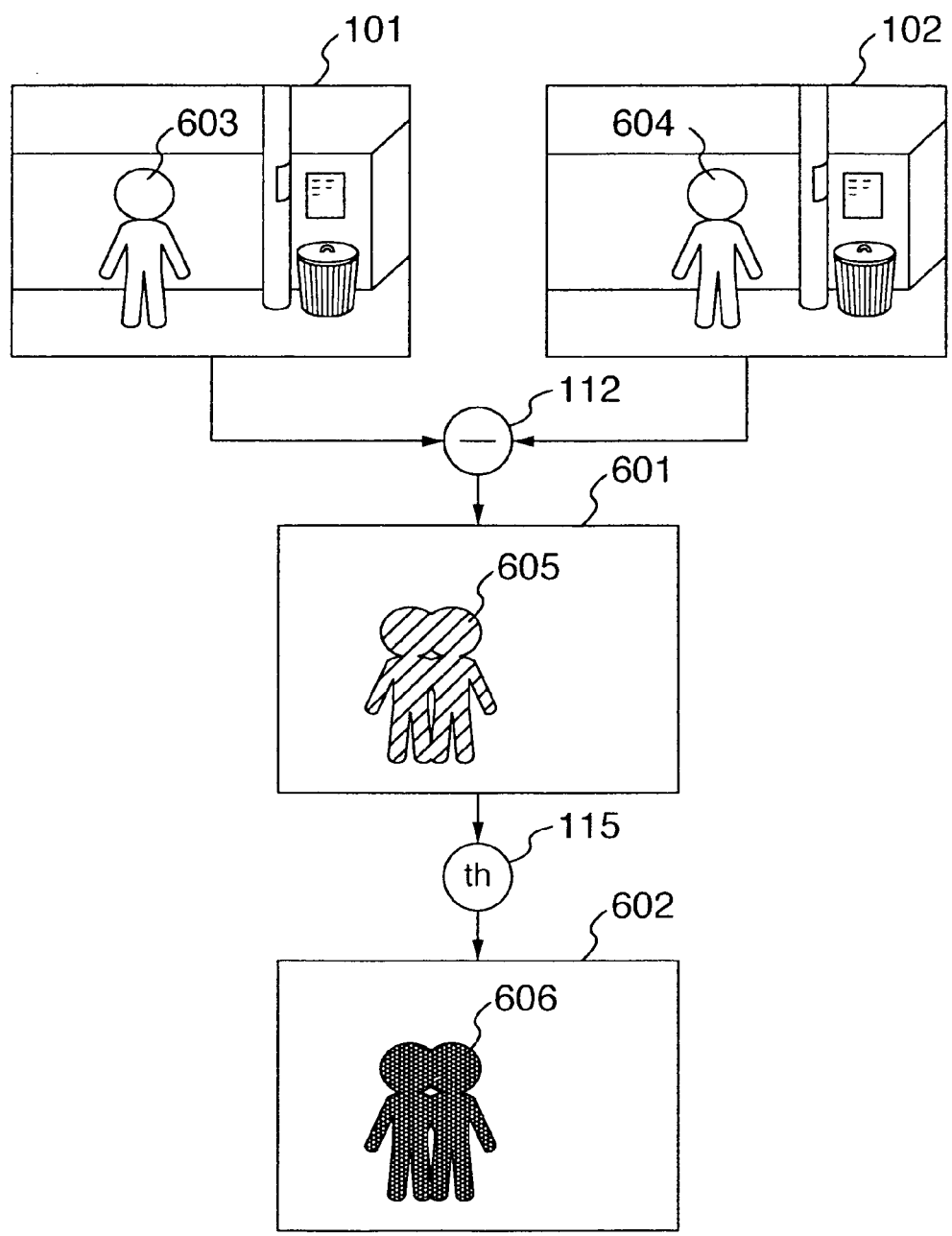
FIG. 6 is a diagram for explaining the principle of an object detecting process in a conventional frame subtraction method.

The procedure shown in the flow chart of FIG. 2 is an intruding object detecting method comprising the steps of: calculating a differential image between an input image 101 from the TV camera 401 shown in FIG. 4 and each of previous input images in a predetermined number of frames (greater than one) stored in the image memory 405 by a frame subtraction method shown in FIG. 6; adding the thus obtained differential images in the predetermined number of frames while weighting the respective differential images to thereby generate a synthesized differential image; binarizing the synthesized differential image on the basis of a predetermined threshold value; and detecting an object intruding into the visual field of the TV camera 401 on the basis of the binarized image.

First, in an image input step 201, an input video signal of an image picked up by the TV camera 401 is obtained as an input image 101, for example, of 320×240 pixels. Then, in a frame counter clearing step 202, the value i of a frame counter, which is a variable used for managing the number of the image to be subjected to the frame subtraction, is set to "1".

Then, in a frame subtraction step 203, a difference (hereinafter represented by $c_i(x, y)$ in which i is the value of the frame counter, and (x, y) indicates the position of the pixel on the image) for each pixel between the input image 101 (here, represented by $a(x, y)$) and the previous input image (here, represented by $b_i(x, y)$) retained in the image memory 405 is calculated.

At this time, the input image to be subjected to the difference calculation retained in the image memory 405 is determined on the basis of the frame number. When, for example, the value i of the frame counter is "1", the input image is an input image $b_1(x, y)$ which is the one most recently stored in the image memory 405 (i.e. one frame before the input image 101). The difference for each pixel is calculated as follows.

$$C_i(x, y) = |a(x, y) - b_i(x, y)| \quad (1)$$

Then, in the frame counter increment step 204, the value of the frame counter is increment by one.

In the frame termination judging step 205, process goes to the frame subtraction step 203 when the value of the frame counter is smaller than a predetermined value N (for example, N=3), and goes to a differential image synthesizing step 206 when the value of the frame counter is equal to or greater than the predetermined value N. Here, the predetermined value N indicates the number of frames to be subjected to the frame subtraction, namely, the number of the input images to be retained in the image memory 405. For example, when N=4, it means that the number of the input images retained in the image memory 405 is 4. In this case, differential images in 4 frames ($c_i(x, y)$ in which i is an integer of from 1 to 4) are obtained.

Then, in the differential image synthesizing step 206, the obtained differential images in N frames are added together while being weighted with a predetermined weighting coefficient image $d_i(x, y)$ (which will be described later) to thereby obtain a synthesized differential image $e(x, y)$. The weighting coefficient image is defined in FIG. 14. The synthesized differential image $e(x, y)$ is calculated as represented by the following expression:

$$e(x, y) = \frac{1}{255} \sum_{i=1}^{N} di(x, y)^* ci(x, y) \quad (2)$$

in which the weighting coefficient image di(x, y) is previously set as follows.

$$\sum_{i=1}^{N} di(x, y) \leq 255 \quad (3)$$

The weighting coefficient image di(x, y) indicates the rate of contribution by which each differential image ci(x, y) contributes to the synthesized differential image e(x, y). For example, when d1(100, 100)=255, it means that the rate of contribution of the first differential image c1(x, y) to the synthesized differential image e(x, y) is 100% in the coordinates (100, 100). (The weighting coefficient image is expressed as an image having pixels each composed of 8 bits. When the pixel value of the weighting coefficient image is "0", it means that the rate of contribution is 0%. On the other hand, when the pixel value is "255", it means that the rate of contribution is 100%.)

Figure 14:
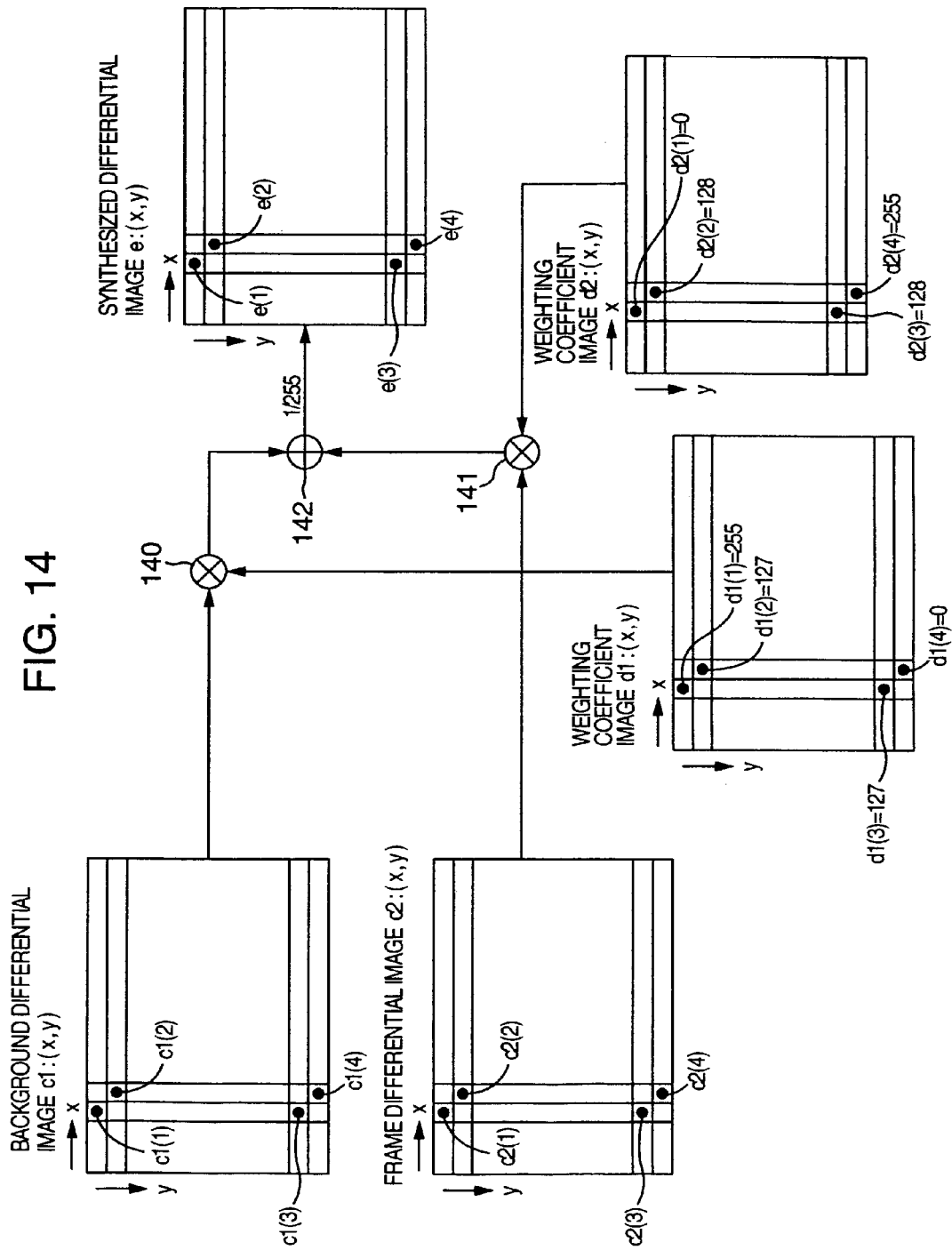
FIG. 14 is a diagram showing an example of how a synthesized differential image is made from differential images and weighting coefficient images.

FIG. 14 shows an example in which the number of frames of the differential images is 2, namely, ci(x, y), where i=1, 2. For brevity's sake, explanation will be made focusing on pixel positions (1)–(4) of each of differential images, weighting coefficient image and synthesized image.

In FIG. 14, luminance values (pixel values) of the differences at respective pixel positions (1)–(4) of the background differential image c1(x, y) are outputted to a multiplier 140 and luminance values (pixel values) of the differences at respective pixel positions (1)–(4) of the frame differential image c2(x, y) are outputted to a multiplier 141. Further, in the weighting coefficient image d1(x, y), weighting coefficients at the same pixel positions (1)–(4) as those of the background differential image are given values having the same dimension as luminance values. For example, the weighting coefficient d1(1) at the pixel position (1) is given "255", d1(2) at the pixel position (2) is given "127", d1(3) at the pixel position (3) is given "127" and d1(4) at the pixel position (4) is given "0". Similarly, in the weighting coefficient image d2(x, y), d2(1) is given "0", both of d2(2) and d2(3) are given "128" and d2(4) is given "255".

Therefore, by carrying out a multiplying operation pixel by pixel with the multipliers 140 and 142, adding together the outputs of the multipliers with an adder 142 and dividing the output of the adder by "255", the synthesized differential image e(x, y) is obtained.

Figure 7:
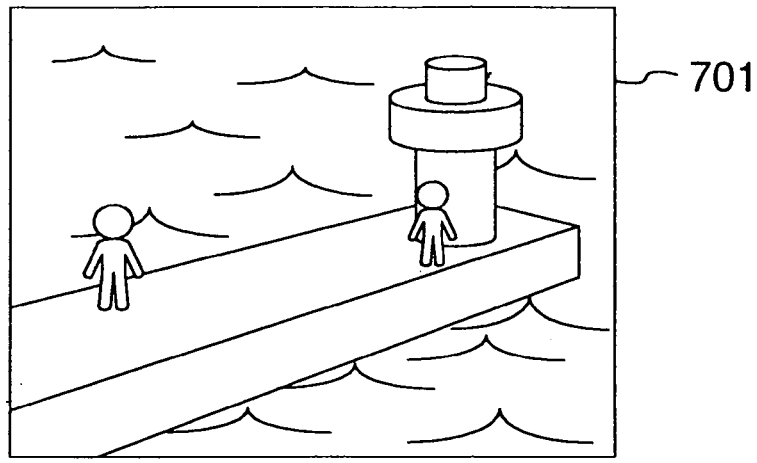
FIG. 7 is a diagram showing an example of an input image in the case where the present invention is applied to maritime surveillance.
Figure 8:
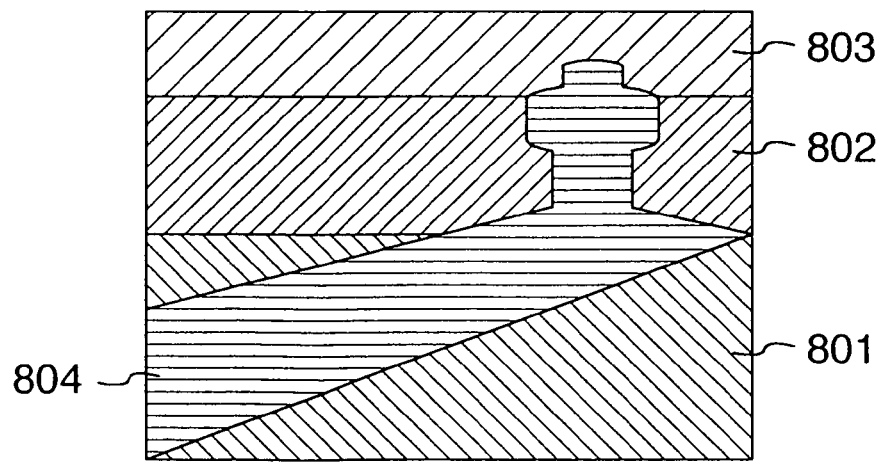
FIG. 8 is a diagram showing a weighting coefficient image in the case where the present invention is applied to maritime surveillance.

Next, the setting of the weighting coefficient image will be further described below with reference to FIGS. 7 to 10 and FIGS. 11A to 11D, FIGS. 12A to 12D and FIG. 13. FIGS. 7 and 8 show an example of the setting of the weighting coefficient image in the case where the present invention is applied to maritime surveillance. In FIG. 7, 701 denotes an input image obtained by imaging the range of the visual field to be monitored. FIG. 8 shows a scene having weighting coefficient images di(x, y) displayed in superposition in a range of i of from 1 to 4 in the case of the value N=4. In this example of FIG. 8, the scene is divided into the region of the surface of the sea and the other region 804 consisting of a seawall and a lighthouse. The region of the surface of the sea is further divided into three sub-regions 801 to 803 in accordance with the distance from the TV camera 401.

The trembling of waves occurring on the surface of the sea is observed more largely as the position goes nearer to the TV camera 401. Therefore, the frame subtraction needs to be done in such a manner that the change in the luminance value due to the trembling of waves may be reduced in a zone nearer to the TV camera 401. Hence, the time interval for inputting images of two frames to be subjected to the frame subtraction needs to be shortened. That is, the differential images are set so that the differential image c1(x, y) is used (i.e. inputting of two-frame images at short interval of e.g. 100 msec) for a zone 801 of the surface of the sea on this side of the scene, the differential image c2(x, y) is used (i.e. inputting of two-frame images at intermediate interval of e.g. 500 msec) for a zone 802 far (for example, by 30 m or more) from the TV camera 401, and the differential image c3(x, y) is used (i.e. inputting of two-frame images at long interval of e.g. 3 sec) for a zone 803 farther (for example, by 100 m or more) from the TV camera 401. For a zone 804 in which there is no trembling of waves, however, the differential image c4(x, y) is used because the time interval for inputting images of two frames can be made long. Accordingly, the weighting coefficient image d1(x, y) may be set such that the values of pixels in the zone 801 to "255" and the values of pixels in the zones 802 to 804 to "0".

Similarly, the weighting coefficient image d2(x, y) may be set such that the values of pixels in the zone 802 to "255" and the values of pixels in the zones 801, 803 and 804 to "0". The weighting coefficient image d3(x, y) may be set such that the values of pixels in the zone 803 to "255" and the values of pixels in the zones 801, 802 and 804 to "0" 1. The weighting coefficient image d4(x, y) may be set such that the values of pixels in the zone 804 to "255" and the values of pixels in the zones 801 to 803 to "0".

Figure 11A:
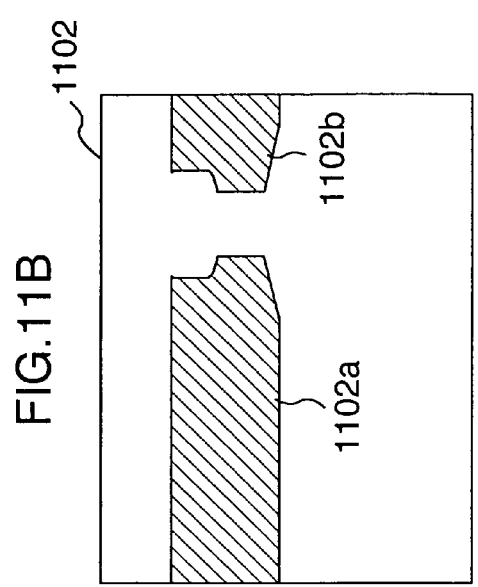
FIGS. 11A to 11D are diagrams for explaining in more detail the setting of the weighting coefficient image depicted in FIG. 8.
Figure 11B:
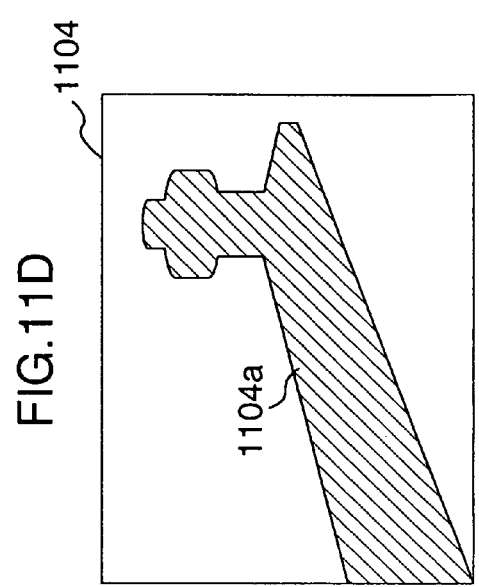
Figure 11C:
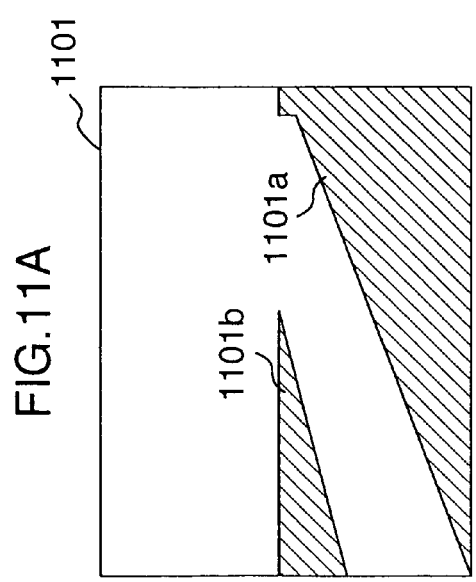
Figure 11D:
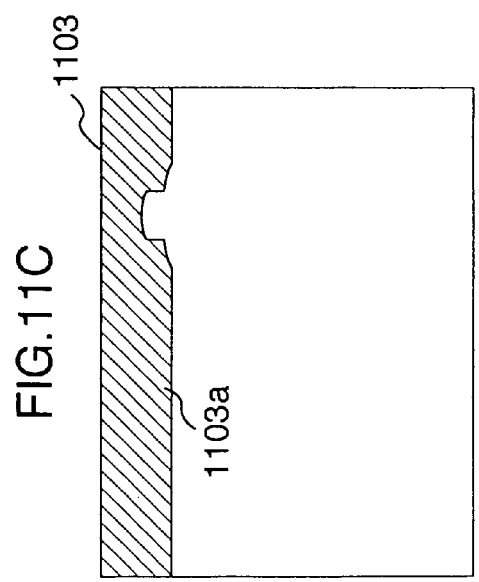

In this manner, the weighting coefficient images d1(x, y) to d4(x, y) are drawn as shown in FIGS. 11A to 11D respectively. FIGS. 11A to 11D show an example in which the values of pixels in the weighting coefficient images di(x, y) are set by two values "0" and "255" in the scene shown in FIG. 7. In FIG. 11A, the image 1101 expresses the weighting coefficient image d1(x, y), which sets pixel values in zones 1101a and 1101b to "255" and pixel values in the remaining zone to "0". In FIG. 11B, the image 1102 expresses the weighting coefficient image d2(x, y), which sets pixel values in zones 1102a and 1102b to "255" and pixel values in the remaining zone to "0". In FIG. 11C, the image 1103 expresses the weighting coefficient image d3(x, y), which sets pixel values in a zone 1103a to "255" and pixel values in the remaining zone to "0". In FIG. 11D, the image 1104 expresses the weighting coefficient image d4(x, y), which sets pixel values in a zone 1104 a to "255" and pixel values in the remaining zone to "0".

It is a matter of course that the values of pixels near to the boundary between zones may be set to be smaller than "255". For example, d1(x, y)=128 and d2(x, y)=127 may be applied to pixels corresponding to the boundary between the zones 801 and 802. That is, the weighting coefficient images may be drawn as shown in FIGS. 12A to 12D respectively.

FIGS. 12A to 12D show an example in which the width of the boundary is set to 30 pixels and in which values of the pixels in the weighting coefficient images di(x, y) are set by three values "0", "127" and "255" in the scene shown in FIG. 7. (Because the maximum pixel value "255" cannot be divided by "2", the remainder generated by the distribution of the weighting coefficients (contribution rates) is allocated to any one of the weighting coefficient images. Hence, the difference between the pixel values "127" and "128" in the weighting coefficient images is only 0.4% with respect to the maximum weighting coefficient "255", so that the pixel values "127" and "128" can be regarded as one weighting coefficient. Therefore, the pixel value "127" is used in this case.) The image 1201 expresses the weighting coefficient image d1(x, y), which sets pixel values in zones 1201*a* and 1201*b* to "255", pixel values in zones 1201*c* and 1201*d* to "127" and pixel values in the remaining zone to "0". The image 1202 expresses the weighting coefficient image d2(x, y), which sets pixel values in zones 1202*a* and 1202*b* (the same as the zones 1201*c* and 1201*d* respectively) to "128", pixel values in zones 1202*c* and 1202*d* to "255", pixel values in zones 1202*e* and 1202*f* as "127" and pixel values in the remaining zone to "0". The image 1203 expresses the weighting coefficient image d3(x, y), which sets pixel values in zones 1203*a* and 1203*b* (the same as the zones 1202*e* and 1202*f* respectively) to "128", pixel values in a zone 1203*c* to "255" and pixel values in the remaining zone to "0". The image 1204 expresses the weighting coefficient image d4(x, y), which sets pixel values in zones 1204*a* and 1204*b* to "255" and pixel values in the remaining zone to "0". Note that in these setting examples, d4(x, y) is expressed by two values, namely, "0" and "255"because the region 804 consisting of the breakwater and lighthouse does not have the characteristic that the lower a position in the image becomes, i.e. the shorter the distance from the camera becomes, the larger the wave appears as is the case with the other regions 801–803 and it may be sufficient that a single frame time-interval (i.e. frame subtraction) or a background subtraction is applied.

Figure 13:
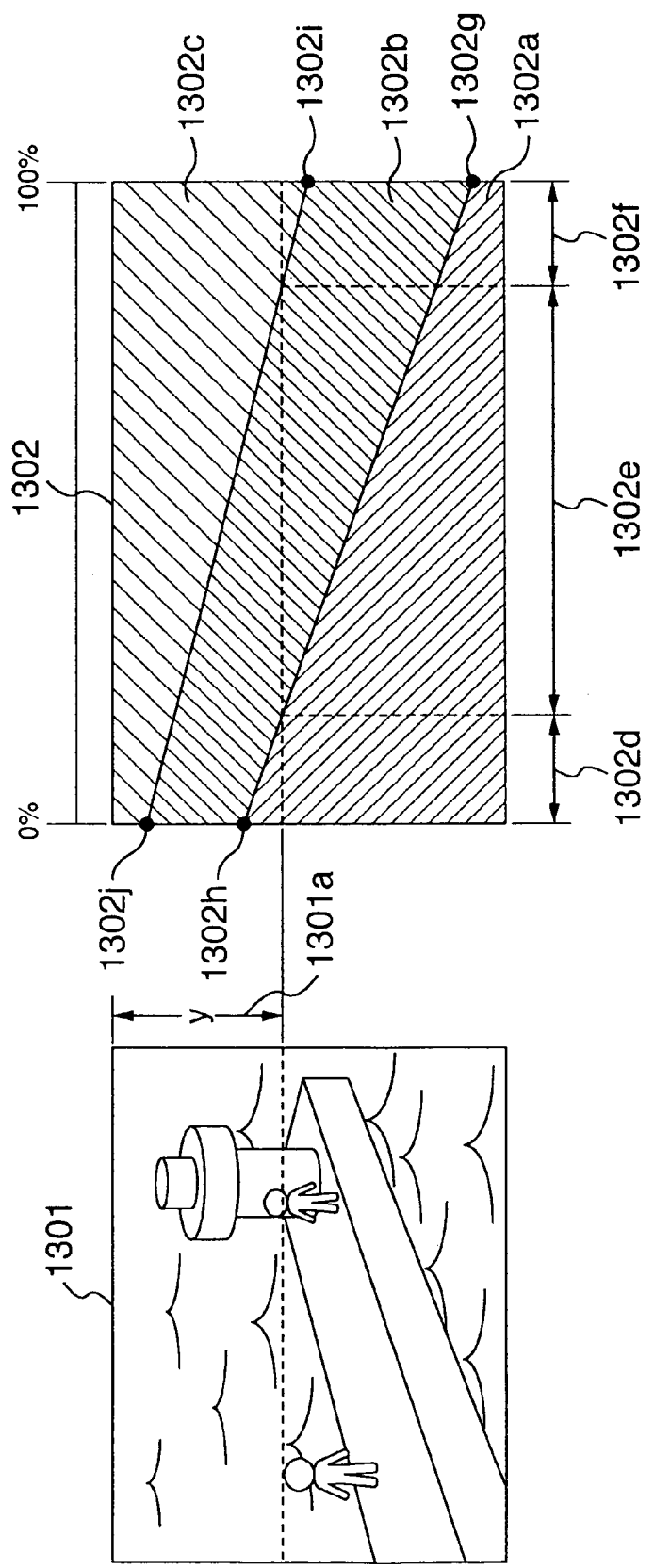
FIG. 13 is a diagram showing an example in which in a weighting coefficient image, pixel values are set with multivalues.

Although FIGS. 11A to 11D and FIGS. 12A to 12D show the case where the weighting coefficients of each weighting coefficient image are set by two or three values, any other weighting coefficient setting method may be used. An example of the weighting coefficient setting method will be described with reference to FIG. 13. FIG. 13 shows an example in which pixel values in each weighting coefficient image are allocated to 256 values in a range of from 0 to 255. In FIG. 13, the image 1301 expresses the same scene as that in FIG. 7, and the graph 1302 expresses the distribution of contribution rates. In the graph 1302 expressing the distribution of contribution rates, the vertical position corresponds to the y ordinate of the image 1301 and the horizontal width expresses the rate of contribution (the value of the weighting coefficient) to the synthesized differential image e(x, y). The graph 1302 is divided into three zones 1302*a*, 1302*b* and 1302*c*, which correspond to the weighting coefficient images d1(x, y), d2(x, y) and d3(x, y) of the differential images c1(x, y), c2(x, y) and c3(x, y) respectively. The zones 1302*a* and 1302*b* are separated from each other by a line connecting a point 1302*g* (corresponding to the y ordinate 220) and a point 1302*h* (corresponding to the y ordinate 80). The zones 1302*b* and 1302*c* are separated from each other by a line connecting a point 1302*i* (corresponding to the y ordinate 120) and a point 1302*j* (corresponding to the y ordinate 20). These points 1302*g* to 1302*j* are set experimentally in accordance with the distance from the TV camera 401. For example, the point 1302*g* is set so as to correspond to the y ordinate on the image in accordance with the distance of 10 m from the TV camera 401. Similarly, the points 1302*i*, 1302*h* and 1302*j* are set respectively so as to correspond to the y ordinate on the image in accordance with the distance of 30 m from the TV camera 401, the distance of 80 m from the TV camera 401, and the distance of 150 m from the TV camera 401. When the image is divided into zones as shown in FIG. 13, the widths of the zones 1302*a*, 1302*b* and 1302*c* (that is, the weighting coefficients of d1(x, y), d2(x, y) and d3(x, y)) can be calculated as follows.

$$d_1(x, y) = \begin{cases} 0 & (0 \le y < 80) \\ 255 \dfrac{y - 80}{220 - 80} & (80 \le y < 220) \\ 255 & (220 \le y \le 255) \end{cases} \quad (4)$$

$$d_1(x, y) = \begin{cases} 0 & (0 \le y < 20) \\ 255 \dfrac{y - 20}{120 - 20} & (20 \le y < 80) \\ 255 \left( \dfrac{y - 20}{120 - 20} - \dfrac{y - 80}{220 - 80} \right) & (80 \le y < 120) \\ 255 \dfrac{220 - y}{220 - 80} & (120 \le y < 220) \\ 0 & (220 \le y \le 255) \end{cases} \quad (5)$$

$$d_1(x, y) = \begin{cases} 255 & (0 \le y < 20) \\ 255 \dfrac{y - 20}{120 - 20} & (20 \le y < 120) \\ 255 & (120 \le y \le 255) \end{cases} \quad (6)$$

Here, when, for example, weighting coefficients in the position 1301*a* (y=100) of the image 1301 are calculated, d1(x, y)=36 (width 1302*d*), d2(x, y)=168 (width 1302*e*) and d3(x, y)=51 (width 1302*f*) are obtained. Incidentally, weighting coefficients in the zone 804 in which there is no trembling of waves (that is, to which the background subtraction method can be applied) are set as di(x, y)=0 (i<4) and d4(x, y)=255. Although this embodiment has shown the case where the zones 1302*a*, 1302*b* and 1302*c* determining the contribution rates of the weighting coefficient images are separated from one another by lines connecting the reference points 1302*g*, 1302*h*, 1302*i* and 1302*j* as shown in the graph 1302, the present invention may be applied also to the case where the zones are separated from one another by curves.

Figure 9:
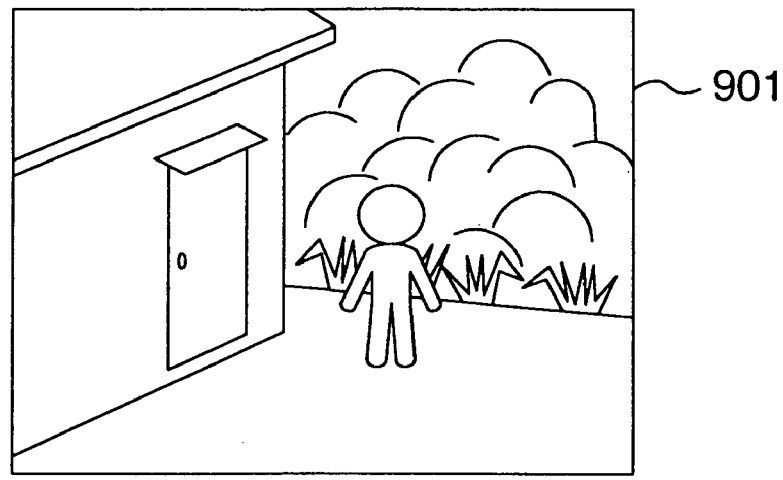
FIG. 9 is a diagram showing an example of an input image in the case where the present invention is applied to outdoor surveillance.
Figure 10:
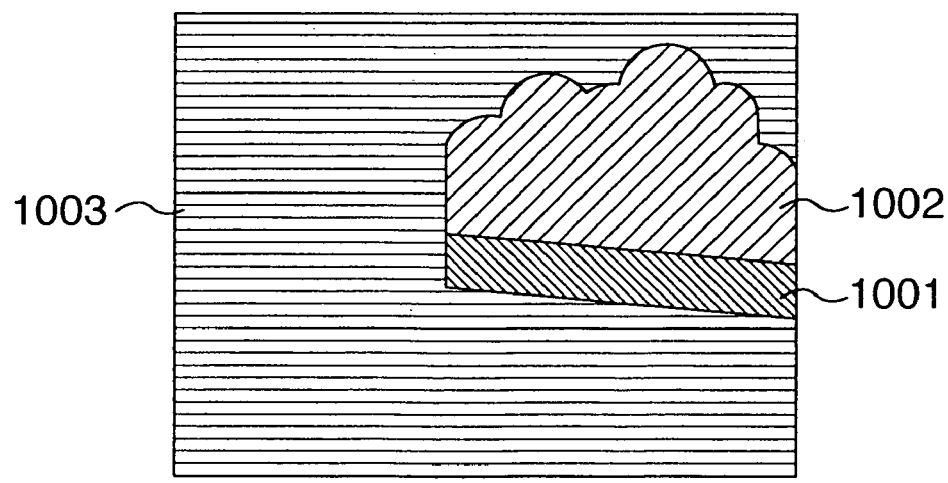
FIG. 10 is a diagram showing a weighting coefficient image in the case where the present invention is applied to outdoor surveillance.

FIGS. 9 and 10 show an example of the setting of weighting coefficient images in the case where the present invention is applied to outdoor surveillance. FIG. 9 shows an input image 901. FIG. 10 shows an example of N=3, that is, the case where weighting coefficient images di(x, y), i=1 to 4, are displayed in superposition. In this example, the image is divided into a building/land/sky zone and a tree/plant zone. The tree/plant zone is further divided into two parts by kind of tree and plant.

In the example shown in FIG. 9, the apparent magnitude of motion on the image is set so that the motion of trees on the upward portion of the image is larger than the motion of plants on the center portion of the image. In the zone in which trembling is large, the time interval for inputting images of two frames to be subjected to the frame subtraction needs to be shortened to reduce the change of the trembling of trees. That is, setting is made so that the differential image c1(x, y) is used for the tree zone 1002 and the differential image c2(x, y) is used for the plant zone 1001. For the zone 1003 in which there is no trembling of trees, however, the differential image c3(x, y) is used because the time interval for inputting images of two frames can be made long. Hence, the weighting coefficient image d1(x, y) sets pixel values in the zone 1002 to "255" and pixel values in the zones 1001 and 1003 to "0".

Similarly, the weighting coefficient image d2(x, y) sets pixel values in the zone 1001 to "255" and pixel values in the zones 1002 and 1003 to "0". The weighting coefficient image d3(x, y) sets pixel values in the zone 1003 to "255"

and pixel values in the zones 1001 and 1002 to "0". It is a matter of course that a weighting coefficient smaller than "255" may be set for pixels near the boundary between adjacent ones of the zones in the same manner as in FIGS. 7 and 8. For example, c1(x, y)=128 and c2(x, y)=127 may be set for pixels corresponding to the boundary between the zones 1001 and 1002.

Furthermore, as shown in FIG. 13, 256 values in a range of from 0 to 255 may be allocated to the weighting coefficient images. Although FIG. 13 shows the case where weighting coefficients are allocated in accordance with the distance from the camera 401, FIG. 9 shows the case where weighting coefficients are allocated in accordance with the degree of motion of an object observed on the image picked up by the TV camera 401. (Setting is made so that the contribution rate of d1(x, y) short in the frame interval used in the subtraction method becomes high in the zone (for example, zone 1002) where the object making large motions is observed, whereas the contribution rate of d3(x, y) long in the frame interval used in the subtraction method or as a difference between the input image and the reference background image becomes high in the zone (for example, zone 1003) where the object making little motions is observed.)

Note that it may be sufficient that the weighting coefficient image is set once when installing the intruding object monitoring apparatus. For this reason, the step of setting the weighting coefficient image is not shown in the flow chart of FIG. 2 as well as in the flow chart of FIG. 3 to be described later.

Then, in a binarizing step 207 in FIG. 2, the synthesized differential image e(x, y) obtained by the differential image synthesizing step 206 is binarized by use of a predetermined threshold value Th (for example, Th=20) so that the pixel value for each pixel of the synthesized differential image e(x, y) (the pixel value for each pixel is calculated on the assumption that each pixel is composed of 8 bits) is set to "0" when the pixel value is smaller than the threshold value Th and as "255" when the pixel value is equal to the threshold value Th or greater. Thus, a binarized image f(x, y) is obtained.

Then, in an intruding object judging step 208, a judgment is made as to whether a cluster of pixels each having the pixel value "255" is present in the thus obtained binarized image f(x, y) or not (that is, whether a cluster of pixels equal to or greater than a predetermined number of pixels (for example, 100 pixels) is present or not). When a cluster of pixels each having the pixel value "255" is present, the cluster is regarded as an intruding object and process goes to an alarm/monitor display step 210 from the branch step 209. When there is no cluster of pixels each having the pixel value "255", process goes to the input image saving step 211.

In an alarm/monitor display step 210, the alarm lamp 409 is turned on through the output interface 407 or, for example, a monitoring result is displayed on the monitor 410 through the image output interface 408.

Then, in an input image saving step 211, the input image 101 is retained in the image memory 405 as an one frame earlier input image b1(x, y). At this time, input images b1(x, y) to bN−1(x, y) which have been previously retained are copied as input images b2(x, y) to bN(x, y) respectively. In this manner, input images up to a N frame earlier input image can be retained in the image memory 405. Note that in the input image saving step 211 the input image 101 may be retained in the image memory 405 one frame by one frame or at intervals of 100 msec. Further, the input image saving step 211 may be placed before the differential image synthesizing step 206 in which case however input images are stored twice, namely, in the image memory 405 in the image input step 201 and again stored in the input image saving step 211, to thereby wastefully use the image memory 405.

In such a manner, any other moving object than the target object in the visual field of the image pickup device can be prevented from appearing as a difference in a differential image, so that accurate intruding object detection can be made.

Figure 3:
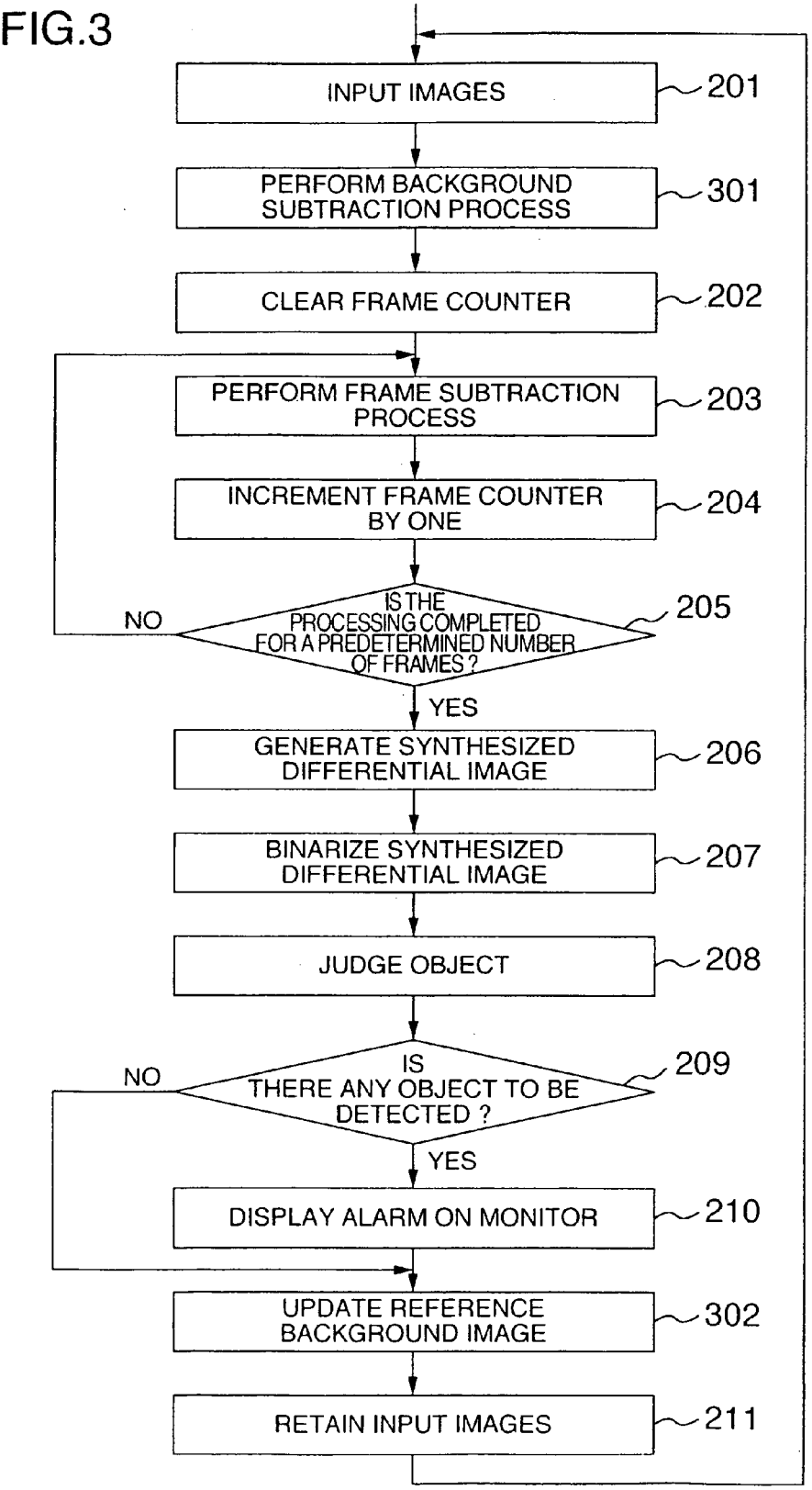
FIG. 3 is a flow chart showing an intruding object detecting procedure according to a second embodiment of the present invention.

FIG. 3 is a flow chart showing an intruding object detecting procedure according to a second embodiment of the present invention. FIG. 3 is obtained by adding a background subtraction step 301 and a reference background image updating step 302 to the flow chart shown in FIG. 2.

In the background subtraction step 301, a difference for each pixel between the input image 101 and the reference background image 105 is calculated as c(x,y). In the differential image synthesizing step 206, the differential image c(x, y) obtained by the background subtraction is synthesized instead of using the differential image between the current input image and an input image of the N-th frame as explained above in the flow chart of FIG. 2. At this time, the background differential image c(x, y) obtained by background subtraction is applied to the zone 804 of FIG. 8 in the flow chart of FIG. 3 though the differential image c4(x, y) 4 frames before was applied to the zone 804 of FIG. 8 in the flow chart of FIG. 2.

In the reference background image updating step 302, for example, pixels of the input image and pixels of the reference background image are averaged to generate a new reference background image. Because the other steps in the flow chart of FIG. 3 are the same as those in the flow chart of FIG. 2, description thereof will be omitted.

Figure 1:
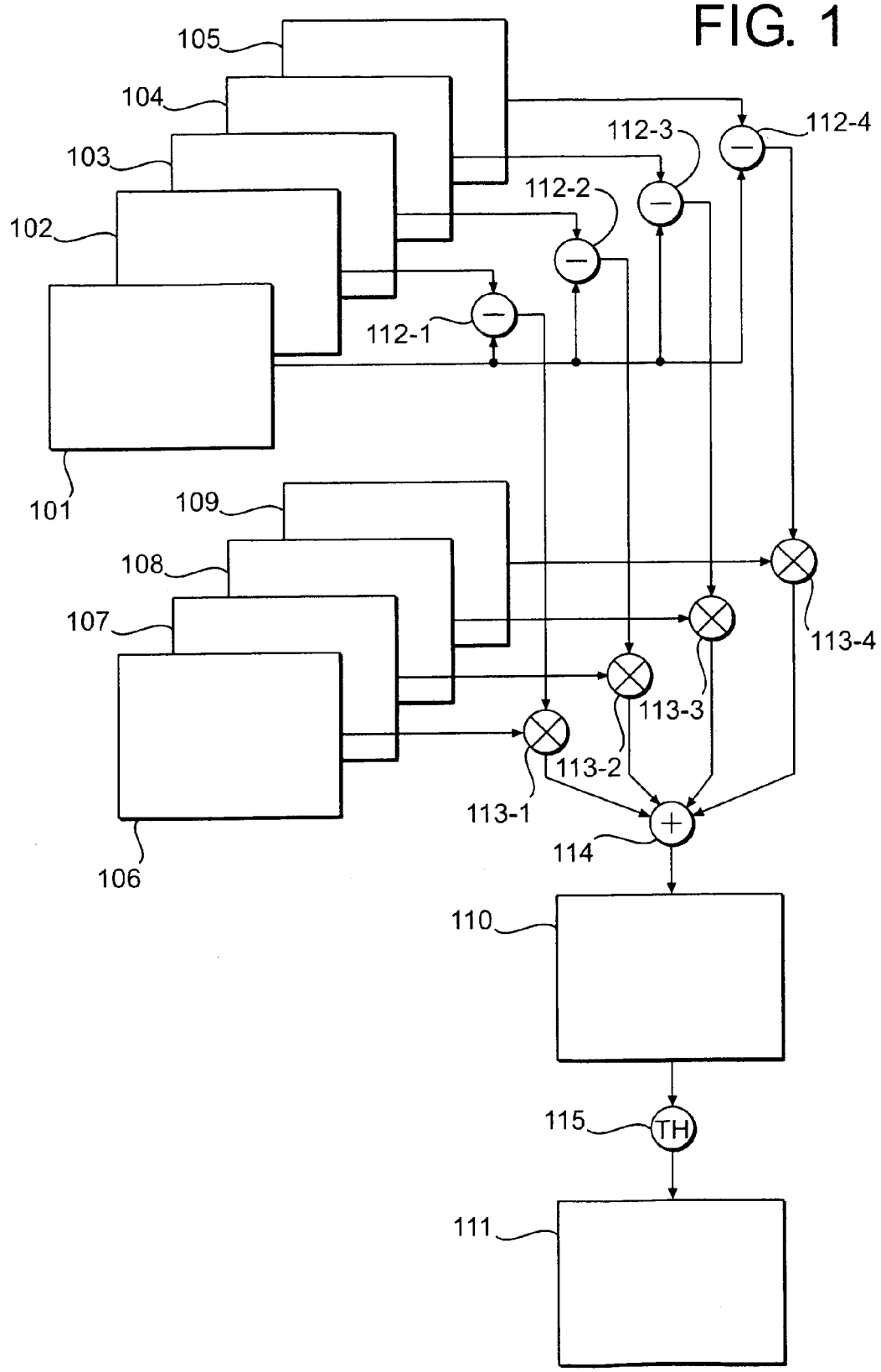
FIG. 1 is a diagram for explaining the operation of an intruding object detecting process according to the present invention.

This series of processing flows will be described below with reference to FIG. 1. FIG. 1 shows an example in which three frames are used for the frame subtraction and the background subtraction is also used (namely, N=4). In FIG. 1, the image 101 represents a current input image, the image 102 represents an image inputted at a time different from that at which the input image 101 was inputted (for example, an input image inputted one frame earlier), the image 103 represents an image inputted at a time further different from that at which the input image 101 was inputted (for example, an input image inputted two frames earlier), the image 104 represents an image inputted at a time still further different from that at which the input image 101 was inputted (for example, an input image inputted three frames earlier), and the image 105 represents a reference background image. Further, the image 106 represents a weighting coefficient image for a differential image between the current input image 101 and the input image 102, the image 107 represents a weighting coefficient image for a differential image between the current input image 101 and the input image 103, the image 108 represents a weighting coefficient image for a differential image between the current input image 101 and the input image 104, and the image 109 represents a weighting coefficient image for a differential image between the current input image 101 and the reference background image 105.

A difference for each pixel between the current input image 101 and the input image 102 is calculated by a subtractor 112-1. The product of the thus obtained differential image and the weighting coefficient image 106 for each pixel is calculated by a multiplier 113-1 and supplied to an adder 114. A difference for each pixel between the current input image 101 and the input image 103 is calculated by a subtractor 112-2. The product of the thus obtained differential image and the weighting coefficient image 107 for each pixel is calculated by a multiplier 113-2 and supplied to the adder 114. A difference for each pixel between the current input image 101 and the input image 104 is calculated by a subtractor 112-3. The product of the thus obtained differential image and the weighting coefficient image 108 for each pixel is calculated by a multiplier 113-3 and supplied to the adder 114. A difference for each pixel between the current input image 101 and the background image 105 is calculated by a subtractor 112-4. The product of the thus obtained differential image and the weighting coefficient image 109 for each pixel is calculated by a multiplier 113-4 and supplied to the adder 114.

In the adder 114, the supplied differential images of 4 frames are added together for each pixel to thereby obtain a synthesized differential image 110. Each pixel in the synthesized differential image 110 thus obtained is compared with a predetermined threshold value by the binarizer 115. If the pixel value of the pixel is equal to or greater than the threshold value, it is set to "255". On the other hand, if the pixel value is less than the threshold value, it is set to "0". Thus, a binarized image 111 is obtained. In such a manner, any other moving object than the target object existing in the visual field of the image pickup device can be prevented from appearing as a difference in a differential image, so that accurate intruding object detection can be made.

Hence, in accordance with the embodiments of the present invention, frame subtraction images obtained from input images at different frame time intervals and a background subtraction image between the input image and the reference background image are synthesized by using predetermined weighting coefficients respectively. Hence, any moving objects such as leaves or waves other than the target object in the monitoring visual field to be monitored can be prevented from appearing as a difference in a differential image, so that the range of application of the intruding object detecting apparatus can be widened.

According to the present invention, there can be provided an intruding object detecting method and an intruding object monitoring apparatus for detecting a target object intruding into an image pickup region while reducing the error detection of moving objects other than the target object.

What is claimed is:

1. An object detecting method for detecting an object in an image obtained from an image pickup means, comprising:
   a frame subtraction step of executing a plurality of frame subtraction processings each frame subtraction processing being between an input image from the image pickup means and respective ones of a plurality of images each having a different time interval with respect to the time interval of said input image;
   a synthesizing step of adding together a plurality of differential images obtained by said frame subtraction processings based on coefficients which are set for respective ones of predetermined regions of the image; and
   an object detecting step of detecting an object based on data obtained from said synthesizing step.

2. An object detecting method according to claim 1, wherein said coefficients are set based on a distance from the image pickup means.

3. An object detecting method according to claim 1, wherein said coefficients are set based on a magnitude of movement of an object in a respective one of predetermined regions of said image.

4. An object detecting method for detecting an object in an image obtained from an image pickup means, comprising:
   a frame subtraction step of executing a plurality of frame subtraction processings each frame subtraction processing being for each of a plurality of predetermined regions,
   wherein each of the predetermined regions has a frame time interval which is changed from the frame time intervals of each of the other predetermined regions; and
   an object detecting step of detecting an object based on a plurality of differential images obtained from said frame subtraction proessings.

5. An object detecting method according to claim 4, wherein said frame time interval is set based on a distance from said image pickup means.

6. An object detecting method according to claim 4, wherein said frame time interval is set based on a magnitude of movement of an object tin respective one of predetermined regions of said image.

7. An object detecting apparatus for detecting an object in an image obtained from image pickup means, comprising:
   frame subtraction means for executing a plurality of frame subtraction processings each frame subtraction processing being between an input image from the image pickup means and respective ones of a plurality of images each having a different time interval with respect to the time interval of said input image;
   synthesizing means for adding together a plurality of differential images obtained by said frame subtraction processings based on coefficients which are set for respective ones of predetermined regions of the image; and
   object detecting means for detecting an object based on data obtained from said synthesizing means.

8. An object detecting apparatus according to claim 7, wherein said coefficients are set based on a distance from said image pickup means.

9. An object detecting apparatus according to claim 7, wherein said coefficients are set based on a magnitude of movement of an object in respective one of predetermined regions of said image.

10. An object detecting apparatus for detecting an object in an image obtained from an image pickup means, comprising:
    frame subtraction means for executing a plurality of frame subtraction processings each frame subtraction processing being for each of a plurality of predetermined regions,
    wherein each of the predetermined regions has a frame time interval which is changed from the frame time intervals of each of the other predetermined regions; and
    object detecting means for detecting an object based on a plurality of differential images obtained from said frame subtraction processings performed by said frame subtraction means.

11. An object detecting apparatus according to claim 10, wherein said frame time interval is set based on a distance from said image pickup means.

12. An object detecting apparatus according to claim 10, wherein said frame time interval is set based on a magnitude of movement of an object in a respective one of the predetermined regions of said image.

* * * * *